July 22, 1958 G. B. FINN, JR., ET AL 2,844,460

METHOD OF PURIFYING GERMANIUM

Filed March 10, 1954

INVENTORS
GEORGE B. FINN JR.
SUMNER MAYBURG
BY Paul S. Martin
ATTORNEY

United States Patent Office 2,844,460

Patented July 22, 1958

2,844,460

METHOD OF PURIFYING GERMANIUM

George B. Finn, Jr., Ipswich, Mass., and Sumner Mayburg, Bayside, N. Y., assignors to Sylvania Electric Products Inc., a corporation of Massachusetts Application March 10, 1954, Serial No. 415,310

2 Claims. (Cl. 75—84)

The present invention is concerned with the processing of semiconductors for electrical semiconductor devices and it is particularly concerned with the group IV materials, notably silicon and germanium. While the illustrative disclosure that follows relates to germanium its application to silicon is self evident, both forming crystals of the same diamond-cubic lattice structure.

It has long been considered harmful to semiconductor devices employing crystals of germanium as a semiconductor body to have copper and other rapidly diffusing impurities present in quantities as low as $5\times10^{-9}$ parts of impurity in the germanium. Such impurities tend to induce instability in the electrical characteristics of the devices, as measured over a period of time, and they also tend to induce uncontrolled variation in multiple units made from a given large crystal of material that is subdivided and made into the units. Copper, for example, has been identified as primarily responsible for changes in the type of semiconductor material when it is subjected to heat treatment, so that the annealed specimen of germanium that is n-type may contain an amount of copper, which upon heating to a temperature above the annealing level, results in conversion of the material to p-type upon quenching. Such materials including copper can be present unintentionally even in germanium when prepared under careful melting and crystal growing conditions.

An object of the present invention is to treat the semiconductor in a way to vastly reduce its content of troublesome impurities of the rapidly diffusing types. This is accomplished by inducing evaporation of such impurities by heating the semiconductor in a hard vacuum. In carrying out this invention, germanium in solid state and in wafer form is heated to a temperature exceeding that at which the impurity present in the semiconductor tends to precipitate out of the solution with the semiconductor material itself, that is, above the annealing temperature. The treatment is effected in a vacuum lower than $10^{-4}$ mm. of mercury, being more than can be attained with usual mechanical pumps and accordingly requiring a diffusion pump. If higher pressure is used, the treatment time required is sharply increased so as to be unworkable, practically, for present purposes.

Figure 1:
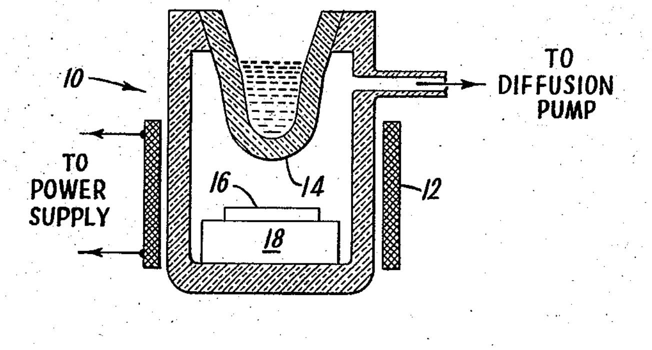
Figure 2:
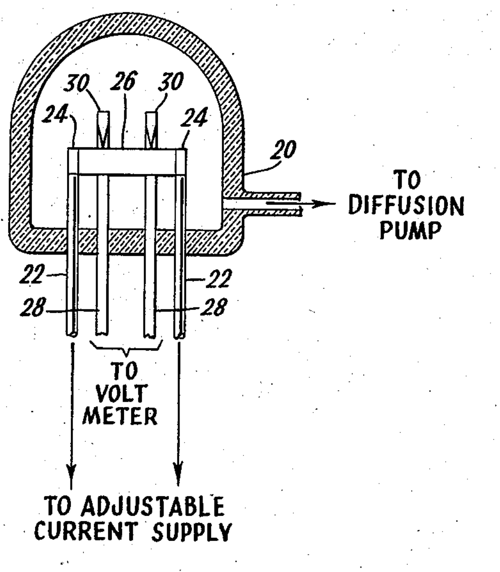

Further aspects of the invention and specific features of novelty will be appreciated from the following illustrative disclosure, which should be read in conjunction with the accompanying drawings wherein:

Fig. 1 is a somewhat diagrammatic cross-section of a heat-treating vacuum furnace useful in performing the novel method; and Fig. 2 is a modified form of heat-treating apparatus, embodying features of the invention.

It has been noted above that for present purposes a maximum feasible pressure during the heat treatment is $10^{-4}$ mm. of mercury. The heat treatment may be carried on over a period of time which may be relatively brief at high temperatures and at extremely low pressures; or if a hard vacuum is not used and comparatively low temperatures are used in the operative range of temperatures, much longer periods of time are required. For example, at 700° C., a period of the order of 10 hours is required in treating a germanium specimen .020 inch thick at a pressure of $5\times10^{-7}$ mm. of mercury in order to reduce the copper content to a level which cannot be detected at liquid nitrogen temperature by Hall and resistivity measurements. This represents a concentration of the order of $10^{10}$ atoms of copper per cubic centimeter. This may be compared to a maximum solubility of copper in germanium of about $10^{16}$ atoms per cubic centimeter, representing $5\times10^{-6}$ parts of copper in the germanium. For most effective operation the pressure should be maintained at a low value such that the mean free path of a copper atom is large compared to the transverse dimensions of the ordinary vacuum heating chamber, usually being only a few inches. At the outset, the removal of the rapidly diffusing impurities from germanium by evaporation theoretically appeared to be improbable because of its extreme dilution in solution in germanium. Also, it was thought that once the copper in the surface layer had evaporated, a barrier of purified germanium remaining would tend to prevent further elimination of copper. However, when it had been achieved in accordance with this invention it was deduced that the evaporation resulted in part from the rapid diffusion of the impurity in the germanium to the surface which thus acted to replenish the impurity concentration depleted by evaporation. That evaporation takes place at all is established in fact; and this may be explained in theory by the phase diagram which shows a copper-rich phase in thermal equilibrium with the dilute solid solution.

As evidence that the process actually does occur, the following observations were made. One side of a specimen of germanium 3/16" thick was plated with radioactive copper by dipping it in a solution of radio-active copper nitrate. This copper was then diffused into the germanium by prolonged heating in an atmosphere of helium at 900° C. (thereby obtaining the maximum solubility of copper in germanium). That complete diffusion did take place was established by etching the sample and then measuring the surface count on both sides of the sample. Equal counts from both surfaces demonstrated that total penetration had taken place. Thereafter a Hall measurement was performed on the germanium sample to give the number of acceptors which were introduced in the form of radio-active copper.

The sample was then placed in a vacuum furnace 10 (Fig. 1) heated by resistance wires 12 with a water cooled surface 14 directly above the germanium sample 16. The sample is shown supported on a quartz plate 18. The sample was then heated in a vacuum, the pressure of which was $5\times10^{-5}$ mm. of mercury at 918° C., for three hours. The count of the water cooled surface was then taken and the results, which compared within experimental error to a subsequent Hall measurement on the sample, showed that more than 96% of the copper had evaporated from the germanium sample. This reduction in the copper content, and correspondingly in the content of other rapidly diffusing impurities, is further established by heating the specimen substantially above the annealing temperature and quenching it. This treatment should result in a conversion of n-type material into p-type material if impurities of the copper (interstitial) type were present but which, in the vacuum treated specimen, showed no tendency to convert. (In this test the effect of thermally induced defects is disregarded.)

The treatment of the solid germanium in the temperature range above the annealing temperature of 500° C. but below the melting point of germanium preferably between 700° C. and 950° C., and at a pressure below $10^{-4}$ mm. of mercury, requires a period of time dependent on the residual impurities that can be tolerated and on the specimen geometry. The time required can be minimized when it is recalled that the diffusion rate of the impurities in the germanium and the evaporation rate are both variables that increase exponentially with temperature and the reduction of the impurity concentration starts rapidly and decreases exponentially with time.

It has been noted above that the mean free path of the copper in the heating chamber at the treating pressure should be large enough so that the copper and the like will be completely removed from the heating zone as by condensation on a cool surface. In the heat treatment of the germanium it is desirable that the walls of the chamber should be cool; and this heating may advantageously be effected by R. F. induction, or by conduction from a R. F. heated support of highly pure graphite; but to avoid contamination from such support it has been found to be especially effective to heat the germanium by its own resistance, passing current directly through the specimen using refractory metal contacts as terminals. In the latter arrangement the heating is confined to the terminals and to the specimen and minimizes the possibility of returning vapor pressure of the copper from what otherwise might be hot surfaces.

This is illustrated in Fig. 2, wherein vacuum chamber 20 has a plurality of lead-in wires, two wires 22 being joined by way of tantalum terminals 24 welded to the ends of a germanium wafer 26; and two more wires 28, connected externally to a voltmeter, terminate in probes 30 engaging the germanium wafer. The germanium is heated by current through the specimen, being the only portion of the system (except for the terminals 24) that is heated and thus promoting permanent removal of vaporized impurities leaving the germanium. The resistance-heating is readily varied, and is easily held constant, since any rise in temperature of the specimen is accompanied by a drop in resistance and a corresponding drop in heating, so long as the resistance of the supply is large compared to the resistance of the specimen.

The readings of the voltmeter connected to wires 28 can be used to measure the temperature of the germanium during heat treatment, provided that the resistance-versus-temperature curve of germanium is at hand and provided the temperature of the specimen is measured directly at one temperature point (as with an optical pyrometer) to calibrate the system. The voltage across probes 30 results from the flow of current from wires 22 through the wafer. In this arrangement the heat is confined essentially to the germanium so as to leave the furnace walls cool and thus in ideal condition to condense the copper and other evaporated material.

The usual devices that may be made from germanium treated as above include point contact rectifiers, point contact transistors, photo-diodes, and so-called junction diodes and transistors all of well known construction. The vacuum heat treated germanium, freed of surface and bulk impurities of the rapid-diffusing types, may be utilized in device manufacture, following appropriate steps, well known in the art, to reduce it to appropriate unit dimensions, and to prepare its surface and to apply the desired ohmic and rectifying connections.

What is claimed is:

1. The method of removing traces of copper and the like from crystalline germanium, including the steps of forming a wafer of such germanium and treating the wafer in a vacuum at a pressure not higher than $10^{-4}$ mm. of mercury and at a temperature in the approximate range of between 500° C. and 950° C.

2. The method of removing traces of copper and the like from germanium, including the steps of forming a wafer thereof approximately .020 inch thick and heating the wafer in a vacuum at a pressure of about $5 \times 10^{-5}$ for about three hours at a temperature of about 918° C.

References Cited in the file of this patent

UNITED STATES PATENTS 2,447,929 Whaley ............... Aug. 24, 1948